(12) United States Patent
DiCecco

(10) Patent No.: US 8,605,549 B1
(45) Date of Patent: Dec. 10, 2013

(54) METHOD FOR PRODUCING A GEOREFERENCE MODEL FROM BATHYMETRIC DATA

(75) Inventor: John DiCecco, Wakefield, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 100 days.

(21) Appl. No.: 13/478,709

(22) Filed: May 23, 2012

(51) Int. Cl.
*G01S 15/89* (2006.01)

(52) U.S. Cl.
USPC .......................................................... 367/88

(58) Field of Classification Search
USPC .......................................................... 367/88
See application file for complete search history.

(56) References Cited

U.S. PATENT DOCUMENTS

| 5,012,675 | A  | * | 5/1991  | Koller et al. ................. 73/432.1 |
| 6,721,694 | B1 | * | 4/2004  | Lambrecht et al. ............. 367/73 |
| 7,337,069 | B2 | * | 2/2008  | Masson et al. .................. 367/73 |
| 8,060,254 | B2 | * | 11/2011 | Myeong et al. ............... 700/253 |
| 8,295,554 | B2 | * | 10/2012 | Francini et al. ............... 382/109 |

* cited by examiner

*Primary Examiner* — Daniel Pihulic
(74) *Attorney, Agent, or Firm* — James M. Kasischke; Michael P. Stanley

(57) ABSTRACT

Creating a georeference model from input bathymetric data includes defining a search limit grid and establishing a geometric model. An iterative RANSAC process is used to fit bathymetric data calculate the geometric model for each cell of the grid. Points that are too far away from the geometric model are removed, and geometric models are recalculated. The compiled geometric models are used as the georeference model. In further embodiments, the georeference model can be smoothed to remove boundaries between cells. Other embodiments provide for using the georeference model for navigation and data transmission.

16 Claims, 5 Drawing Sheets

METHOD FOR PRODUCING A GEOREFERENCE MODEL FROM BATHYMETRIC DATA

STATEMENT OF GOVERNMENT INTEREST

The invention described herein may be manufactured and used by or for the Government of the United States of America for Governmental purposes without the payment of any royalties thereon or therefore.

CROSS REFERENCE TO OTHER PATENT APPLICATIONS

None.

BACKGROUND TO THE INVENTION (1) Field of Invention

The present invention relates to the field of bathymetry, specifically technology for identifying a uniform distribution data set for producing bathymetric surface maps.

(2) Description of the Prior Art

Underwater navigation has been, and continues to be, problematic. Navigation technologies commonly used on land, such as Global Positioning Systems (GPS), are unreliable for underwater navigation. Electromagnetic wave dissipation in water renders technologies such as GPS useless. Without underwater beacons or long baseline navigation, vehicles operating underwater need to autonomously determine their position. Changes in vessel pitch caused by the acceleration of the vessel or other factors can alter the accuracy of bathymetric data substantially. It is necessary to develop and use detailed underwater maps for non-traditional navigation methods.

Known bathymetric software cannot accurately characterize continuously changing bathymetric data sets without complex, time consuming calculations. For example, the gridding method, a mapping system employed by current software programs known in the art for characterizing underwater terrain, defines grid node locations or a fixed number of points to use in a particular grid cell. Because the gridding method relies on a defined grid location or a fixed number of points, it is an unreliable method for mapping terrain which is constantly changing, skewing the accuracy of a resulting map. In addition, the calculations to determine more accurate data from the gridding method require time consuming processing of complex mathematical models, such as multiple regression analysis.

Autonomous underwater vehicles (AUVs) currently rely on the contours of bathymetric surface maps that often contain antiquated or inadequate data. Significant topographical information, known as georeferences, may not appear on those maps. Missed georeferences can cause navigational errors and interfere with AUV missions or even damage expensive AUVs.

For example, U.S. Pat. No. 5,012,675 teaches a system for integrating multiple mappable variables by determining grid node values and associating the grid node values with a map index to create a grid node suite. Cluster locations are used to assign earth features to create a map. U.S. Pat. No. 6,721,694 teaches a system using grid cell spacing for mapping the depths of seabed floors. However, neither system addresses the effects of outlier and anomaly data. Because these systems cannot adjust for such data, resulting bathymetric maps can contain multiple inaccuracies.

U.S. Pat. No. 7,337,069 teaches a system for measuring the thicknesses of sedimentary layers in a basin using existing topographical and seismic data and applying an iterative inversion procedure. While the iterative processes make this system more reliable for determining the thicknesses of underwater sedimentary sequences, this system is also not sufficiently accurate for creating reliable underwater maps for use by AUVs.

U.S. patent application Ser Nos. 11/654,015 now U.S. Pat. No. 8,060,254 and 12/311,050 now U.S. Pat. No. 8,295,554 teach methods for generating maps using RANSAC algorithms. However, both methods are designed for mapping above-water terrain, which is less changeable. Neither method is able to generate a reliable map of underwater terrain or capable of effectively filtering of outlier data.

SUMMARY OF THE INVENTION

The present invention is a bathymetric data processing system which processes outlier data using a RANSAC algorithm to create a georeference model from an observed data sample to identify a uniform distribution data set, enabling the production of an accurate bathymetric map.

The bathymetric mapping software can map bathymetric data on a graphical interface that is more accurate and easily understood than the data characterized by bathymetric maps from software that is known in the art. The invention can represent underwater terrain with any three dimensional surface. The bathymetric mapping software can also process and integrate data from different datasets utilizing different scales of measurement. The bathymetric mapping software can also characterize data having different graph types including planar models, bi-quadratic models, spline graphs and the like. Autonomous underwater vehicles (AUVs) can reference bathymetric maps containing accurate and updated information provided by the bathymetric mapping software.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF INVENTION

Figure 1:
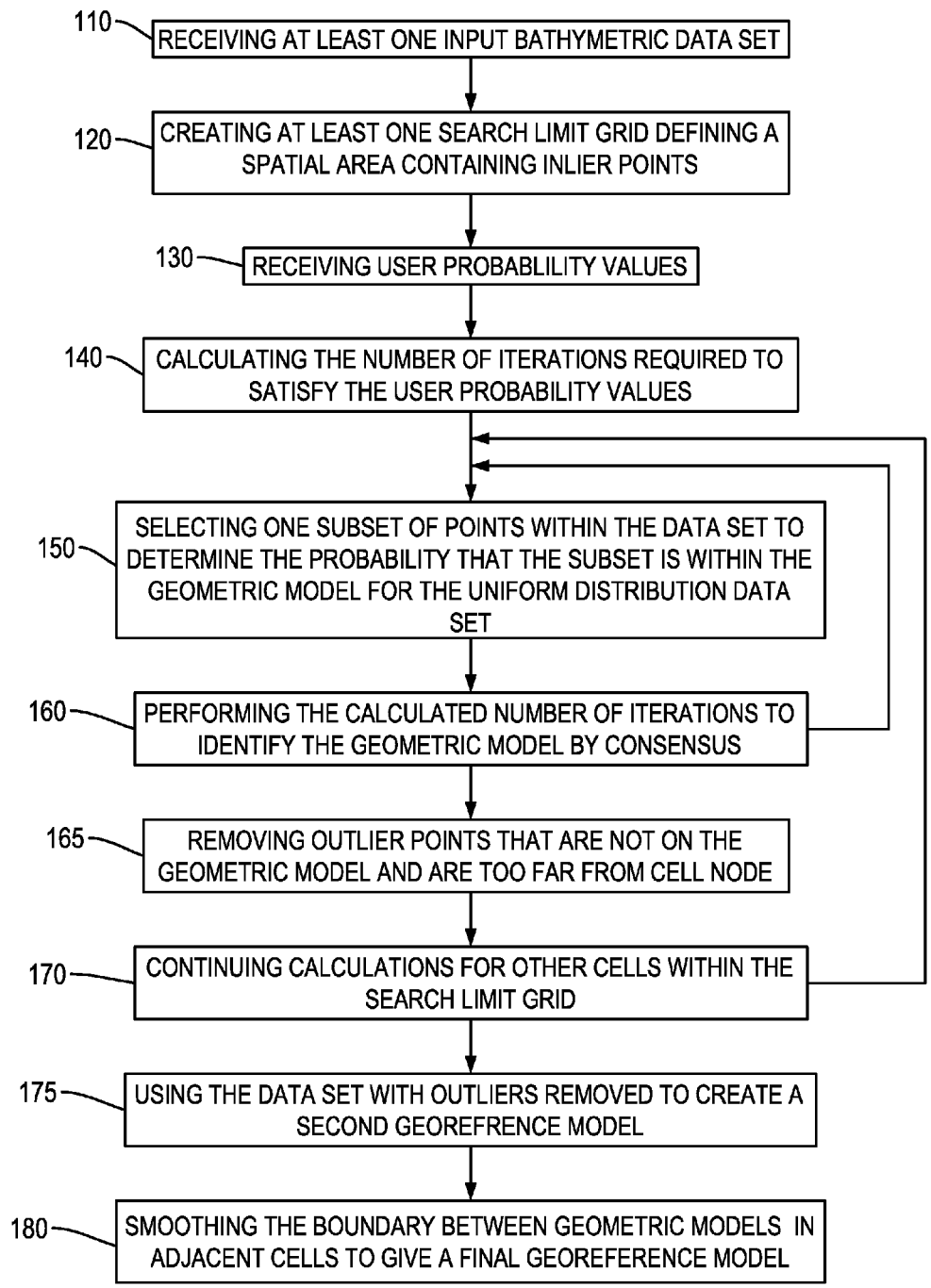
FIG. 1 is a flow chart of an exemplary embodiment of a method for using bathymetric data to create a georeference model with a uniform distribution data set.

For the purpose of promoting an understanding of the present invention, references are made in the text to exemplary embodiments of software that can process, smooth, and grid bathymetric data into a uniform distribution data set. It should be understood that no limitations on the scope of the invention are intended by describing these exemplary embodiments. One of ordinary skill in the art will readily appreciate that alternate but functionally equivalent bathymetric mapping software may be used. The inclusion of additional elements may be deemed readily apparent and obvious to one of ordinary skill in the art. Specific elements disclosed herein are not to be interpreted as limiting but rather as a basis for the claims and as a representative basis for teaching one of ordinary skill in the art to employ the present invention.

The term "bathymetric surface map" refers to a topographical map characterizing underwater terrain. The term "existing bathymetric reference" refers to existing bathymetric data that can be modified or integrated with new surface maps. A georeference is a location in terms of map coordinates (latitude and longitude or displacements relative to a known point). The term "georeference model" refers to a planar or non-planar model that that gives the depth for a provided georeference. "Geometric model" refers to the geometric shape that is being fit to the points of bathymetric data. As used herein, a grid is a collection of uniform sized cells, and grid size refers the user defined dimensions of a grid to characterize a bathymetric data set. The term "inlier" refers to a data point in a bathymetric data set that is in accordance with a calculated georeference model based on a calculated user-defined tolerance. The term "outlier" refers to a data point in a bathymetric data set that is distant from a calculated georeference model based on a calculated user-defined tolerance because of either a gross local variation or an inaccuracy in the bathymetric data set. As used herein, the term "RANSAC" refers to the random sample consensus algorithm, which is an iterative method to estimate parameters of a mathematical model from a set of observed data. As used herein, the term "real time" means a system having strict constraints on response time to allow a response effectively on user demand. The term "search limit grid" refers to a grid created by the software with narrower parameters than the grid defined by the user to filter out irrelevant data.

As used herein, the term "uniform distribution data set" refers to a data set with a consistent pattern created by discarding outlier data. The term "user" refers to any person, computer, processor, hardware, firmware, software or device capable of providing or receiving data necessary to perform or produced by a method for identifying uniform distribution data sets for bathymetric surface maps. "User defined" refers to any input or value chosen by the user operating the software. The term "value of probability" refers to a value representing the likelihood that a particular data point is located within a georeference model.

The method for bathymetric data processing enhances the accuracy of measurements by using processing components to characterize changes in bathymetric data. The method can characterize changes in bathymetric data by using a grid pattern that contains a plurality of grid nodes and by processing data corrupted by outliers and measurement errors.

FIG. 1 is a flow chart of an exemplary embodiment of method 100 for processing bathymetric data by creating a georeference model identifying a uniform distribution data set. The exemplary method illustrated in FIG. 1 employs RANSAC which is not commonly employed for producing bathymetric surface maps.

In step 110 of the exemplary embodiment shown, at least one bathymetric data set is received. A data set may include, but is not limited to, data about the slope, elevation, orientation, other characteristics or combination of characteristics concerning underwater terrain. In some embodiments, data may be received from an autonomous underwater vehicle. This data set includes both inlier and outlier data. This data set can include both newly acquired data sets and pre-existing data sets.

In step 120 the data is processed into a three dimensional search limit grid having a grid size computed in software based on parameters defined by the user. In one exemplary embodiment, the user can select a grid size based on depth, northing, and easting that features 10 meters of depth, 10 meters of northing, and 10 meters of easting. (Northing and easting are distances measured north and east from an origin.) This grid size can be based on known bathymetric features such as slopes, valleys and peaks. In further exemplary embodiments, the user can select the dimensions and size of a grid best suited for a specific bathymetric mapping task.

Step 130 is the step of selecting a user defined values of probability. Two user defined probability values are necessary. A first user defined probability value, p, represents the probability that at least one set of points falls within a georeference model representing a uniform distribution data set. The georeference model can be constructed from many different geometric models. These include a planar geometric model, a bi-quadratic geometric model and a spline model. The particular geometric model can be chosen based on knowledge of the application and the bottom conditions. Because a plane is defined by three points, three points make up the minimum sample set (MSS) for a planar model. Five points make up the MSS for a bi-quadratic model. Other geometric models may require other minimum sample sets. The second probability value, w, is the probability that any MSS will fit the underlying model. p is the probability that at least one MSS will define the underlying model. A geometric model is calculated for each cell of the overall georeference model.

The number of iterations necessary to produce a result with reliability that conforms to user defined probability is calculated in step 140. This is determined in the equation below. "n" is the number of points, which for MSS using a planar geometric model, n=3. RANSAC determines the minimum number of k trials required to achieve p with the following equation:

$$k = \frac{\log(1-p)}{\log(1-w^n)} \quad (1)$$

Next, in step 150, MSS subsets of points within the data sample are randomly selected to determine the probability w that any MSS will fit the underlying model. The MSS is used to compute the geometric model fitting the points.

Iterations are performed in step 160 to determine the parameters of the geometric model for a single cell using a RANSAC algorithm. This computation obtains a consensus for the best fit of the geometric model based on the standard deviation of the MSS subsets of points. Step 160 iterates step 150 until the previously calculated k number of iterations have been executed. This produces a consensus geometric model for the cell. In step 165 the desired bathymetric data is produced by discarding the outlier data. Outlier data is the data that exceeds a statistical measure away from the consensus geometric model. This statistical measure can be a standard deviation, a user established threshold or some other calculated value. The remaining data is the uniform distribution data set. The process for discarding outlier data will be described further hereinafter. Step 170 iteratively processes other cells within the search limit grid. Finally, in step 175, a georeference model is created to using the retained and updated data. This georeference model represents a compilation of coefficients for the cells of the search limit grid. The coefficients mathematically describe the geometric model of each cell. A further routine can be used in step 180 to smooth the boundary between cells to give a final georeference model. A graphical user interface configured with software can then display the georeference model as a bathymetric map.

In further exemplary embodiments, the updated bathymetric data set may be used to create a bathymetric surface map or update or otherwise modify existing bathymetric references or surface maps. In still further exemplary embodiments, updated uniform distribution set data may be compared to existing bathymetric data sets to generate a comparison report. In further exemplary embodiments, resulting updated uniform distribution data sets may be interpreted to establish parameters of the functions performed. For example, updated bathymetric data may be interpreted to establish parameters for enhancing, verifying, correcting, updating, deleting and obscuring bathymetric data sets. In some exemplary embodiments, the interpretation of data and the establishment of parameters may be performed remotely using a remote processor. In still further exemplary embodiments, updated bathymetric data may be translated to a telemetry protocol and transmitted to a satellite or other remote location.

Figure 2:
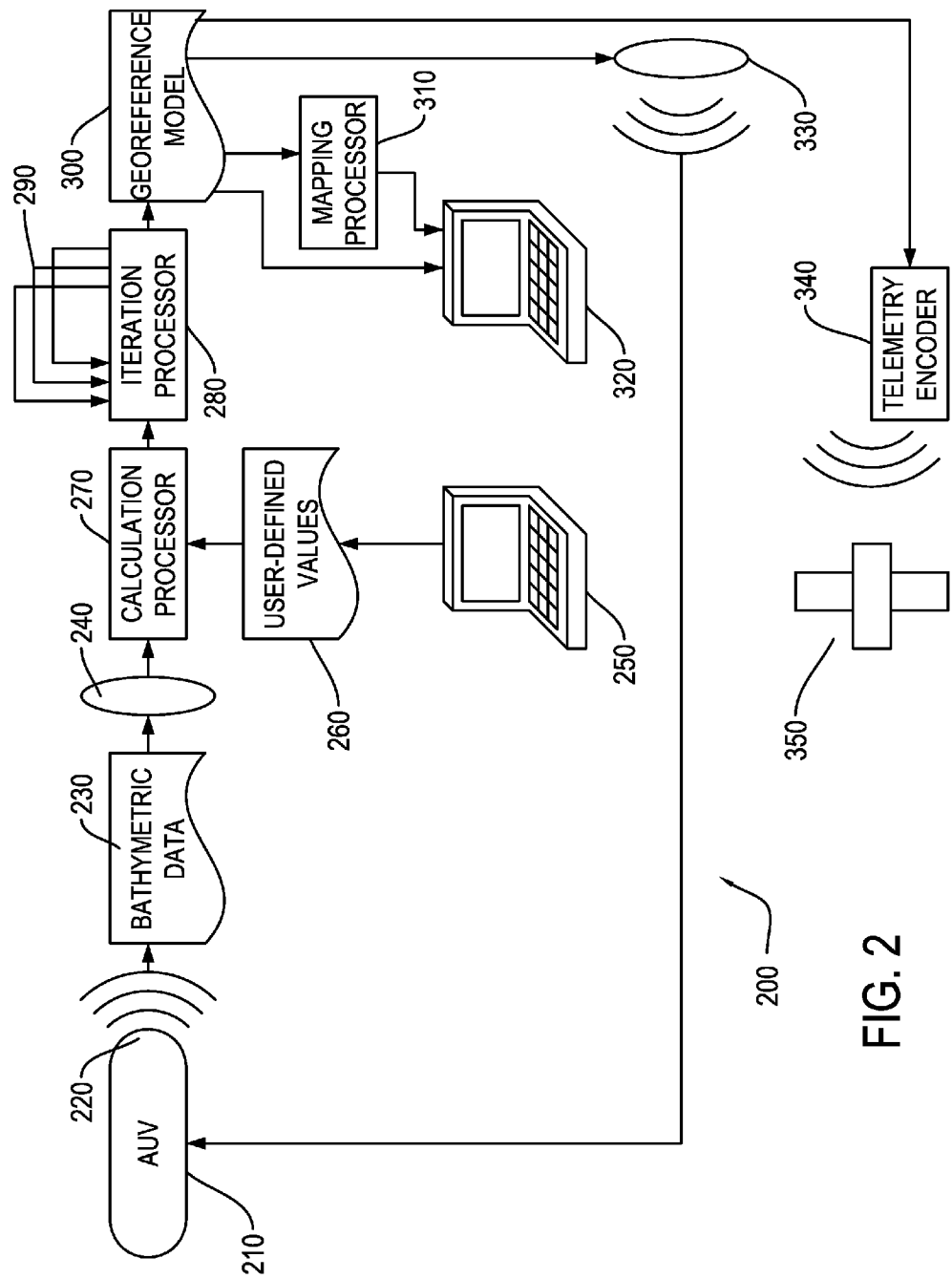
FIG. 2 is an exemplary embodiment of a system which creates a georeference model to identify a uniform distribution of data.

FIG. 2 illustrates an exemplary embodiment of system 200 for creating a uniform distribution data set by processing the bathymetric data set to create a georeference model. System 200 creates and utilizes the uniform distribution data set within the georeference model to create a map or transmit the information to AUVs or satellites. AUV 210 uses first remote transmitter 220 to transmit bathymetric data 230, which is received by receiver 240. Bathymetric data 230 is transmitted using any data structure or technique known in the art. Calculation processor 270 utilizes user defined values of probability 260 entered using a graphical user interface (GUI) 250 or other user interface device. User interface 250 is configured with software to receive user defined values of probability 260 and update calculation processor 270. Calculation processor 270 determines the number of trials, represented by k, necessary to produce parameters represented by a georeference model conforming to the user defined values of probability as described previously with reference to equation (1). Iteration processor 280 conducts k iterations 290 to determine the parameters of georeference model 300. Distinct from the previous bathymetric data 230, georeference model 300 represents a uniform distribution data set that is more accurate than input bathymetric data set 230. A mapping processor 310 extracts information from georeference model 300 sufficient to create a map on GUI 320. GUI 320 can be the same unit as GUI 250.

A second remote transmitter 330 transfers uniform data distribution characterized by georeference model 300 to AUV 210. In another exemplary embodiment, telemetry encoder 340 broadcasts uniform distribution data set determined by georeference model 300 to satellite 350 or some other remote location. System 200 may also include one or more databases for storing pre-existing and updated georeference models, data sets and other temporary or permanent information generated while creating a uniform distribution data set.

Figure 3:
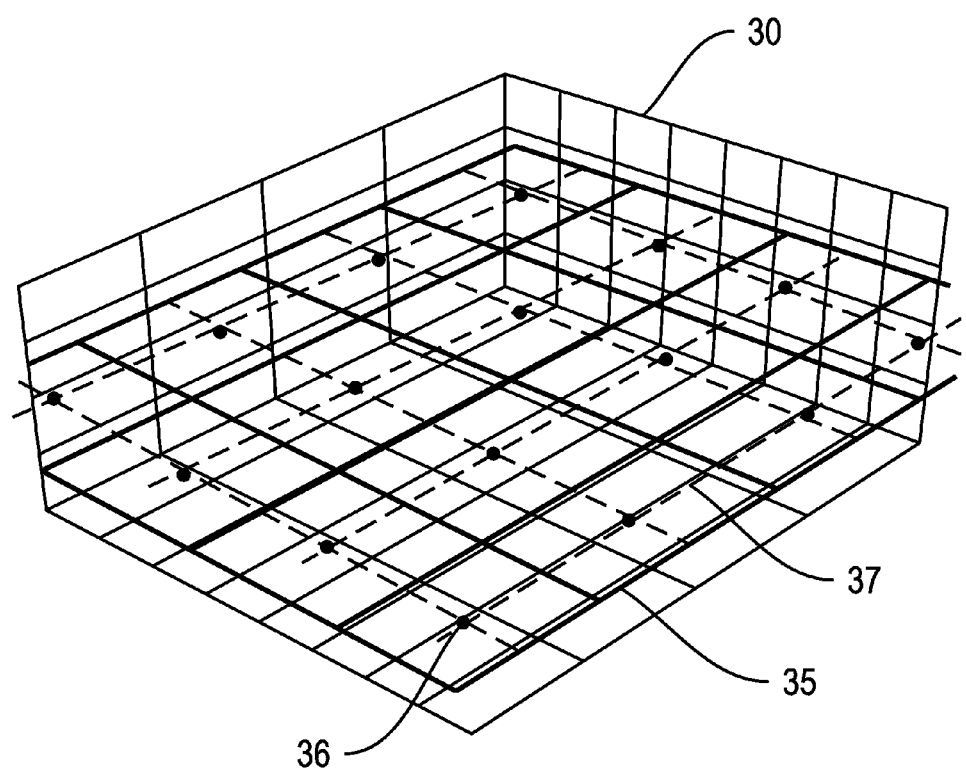
FIG. 3 illustrates an exemplary embodiment of a user defined search grid created to narrow the spatial area of the bathymetric data considered for a georeference model in order to show a uniform distribution data set.

FIG. 3 illustrates an exemplary embodiment of a user defined search grid created to narrow the bathymetric data considered for a georeference model in order to create a uniform distribution data set. A diagram of exemplary original grid 30 and exemplary search limit grid 35 shows how the method for creating a uniform distribution data set involves the creation of a search limit grid. The user determines the size of original grid 30. Original grid 30 is shown in FIG. 3 with thin lines. Search limit grid 35 is shown with bold lines. Search limit grid 35 updates exemplary original grid 30 to better characterize the spatial area of the bathymetric data. Dashed line 37 marks the average of the distances between each segment of exemplary search limit grid 35.

Determining the average of the distances between each segment is necessary for showing the nodes of the grid cells. The intersection of each dashed line 37 is a node 36 of each grid cell. When the method for identifying a uniform distribution data set locates the nodes 36 of each grid cell, the necessary calculations for discarding outlier data can begin.

Figure 4A:
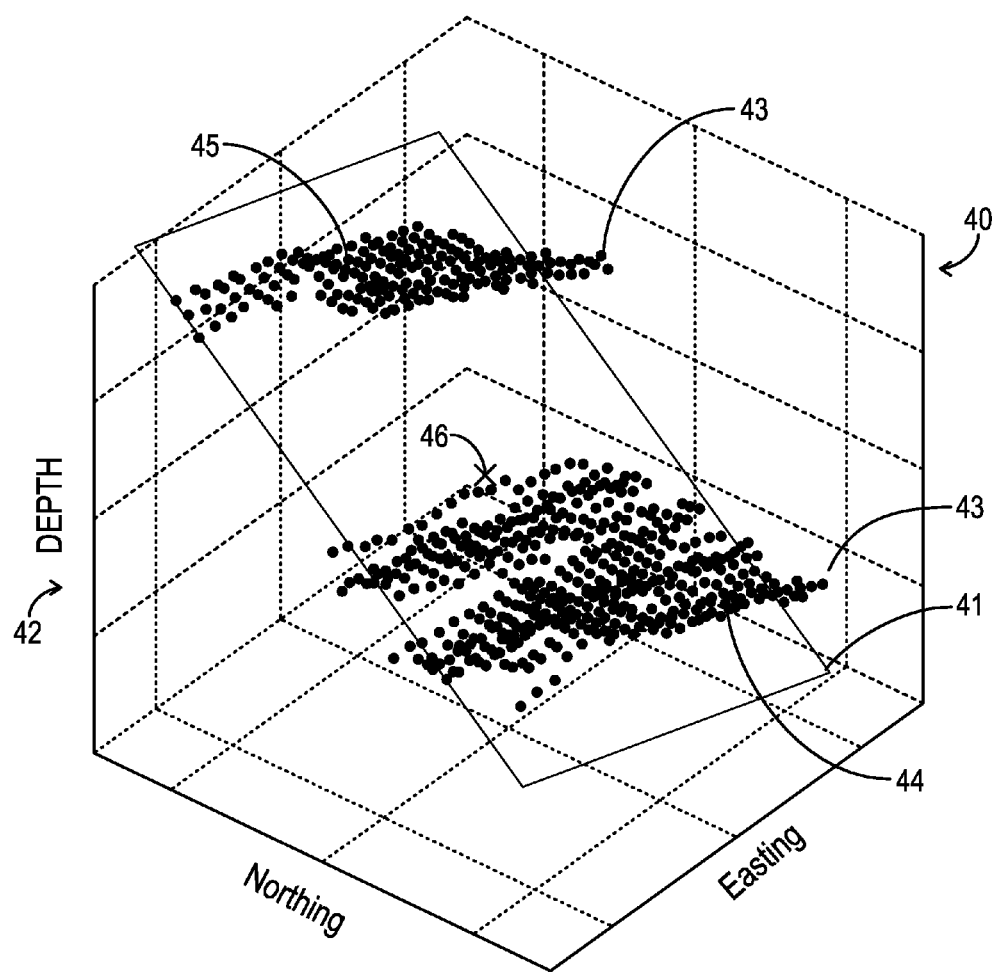
FIG. 4A illustrates an exemplary embodiment of how outlier data is removed and discarded before creating a georeference model identifying a uniform distribution data set.

FIG. 4A illustrates an exemplary set of bathymetric data inputs on which a method for identifying a uniform distribution data set with a georeference model may be performed. In the exemplary scatter point graph 40 of an exemplary set of bathymetric data inputs, there is an exemplary geometric model 41 having a depth range 42. Geometric model 41 is a portion of the final georeference model. Outlier data is shown at 43. Two sets of inlier data are shown at 44 and 45. Data set shown at 44 is deeper than data set shown at 45. A node of the cell is shown at 46.

As such, FIG. 4A illustrates a comparative representation of inlier data sets 44 and 45, which can later be used to craft a bathymetric surface map. This includes a method for creating a georeference model identifying a uniform distribution data set. However, the data needs to be narrowed into a more uniform distribution data set in order for the data to be useful to craft an accurate bathymetric surface map.

Because autonomous underwater vehicles (AUVs) rely on sonar to collect bathymetric data, dramatic variances in data can result from changes in pitch caused by the acceleration of AUVs. This explains the dramatic gap in depth between inlier data distributions 44 and 45 within georeference model 41 shown in this exemplary embodiment. Interpolation methods known in the art, such as multiple regression, are complex and computationally intensive. Because of the use of outlier input data 43 in interpolation calculations known in the art, the newly determined distribution of data would still suffer from accuracy issues.

Figure 4B:
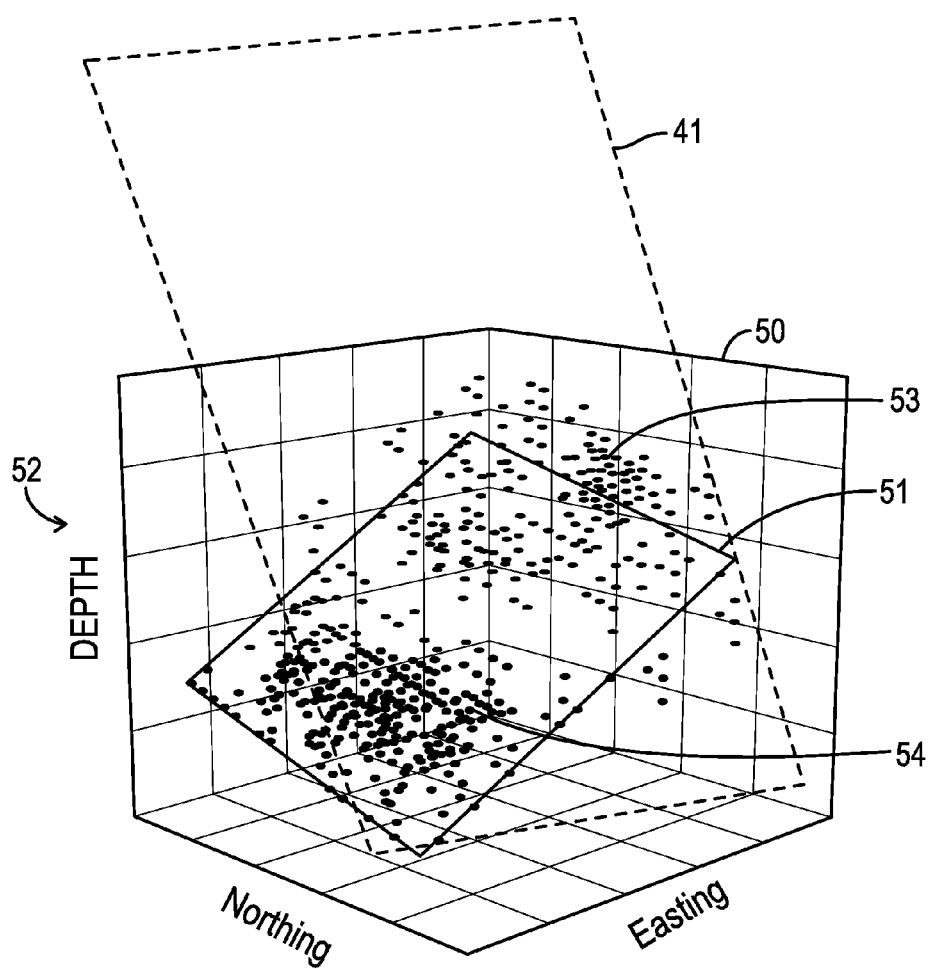
FIG. 4B illustrates an exemplary embodiment of how a bathymetric georeference model identifies a uniform distribution data set.

FIG. 4B illustrates an exemplary 5×5 m$^2$ scatter point graph 50 with the same exemplary input data set as FIG. 4A. The georeference model of FIG. 4A is shown by dashed lines 41. A modified georeference model 51 is created by the current method for producing a uniform distribution data set utilizing the RANSAC algorithm. Depth range 52 is narrower than range 42 shown in FIG. 4A. The bathymetric software employs a RANSAC algorithm, which consists of an iterative process to remove outlier data. Grid 50 is an exemplary embodiment of a search grid which narrows the range of depth 52 for assessed bathymetric data. Outliers are shown at 53. Some of the data points of inlier data sets 44 and 45 shown FIG. 4A do not appear as outliers 53 in FIG. 4B, because they are not present on grid 50. As a consequence of performing the current method, data points of inlier data sets 44 and 45 that are shown in FIG. 4A are not shown in FIG. 4B because they aren't sufficiently near the nodes of grid 50. This is determined using a distance weighted interpolation method such as kriging or the like. This method uses Guassian fall-off to give points near the node higher weighting than those further away from the node.

Georeference model 51 consequently possesses a more accurate inlier data set 54 with a narrower range than the inlier data sets 44 and 45 shown in FIG. 4A. FIG. 4B illustrates how this embodiment of a method for creating a bathymetric georeference model narrows a set of bathymetric data into an accurate and more useful uniform distribution data set 54 than the inlier data sets 44 and 45 as shown in FIG. 4A.

The accuracy of interpolation is greater when the data has a unified distribution. Consequently, the method for producing a uniform distribution data set with a georeference model results in the creation of accurate bathymetric surface maps. In other embodiments, this method for producing a uniform distribution data set can also characterize georeference models as a biquadratic model or as a spline in addition to a planar model.

It will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A method for creating a georeference model comprising the steps of:
   receiving at least one input bathymetric data set having a plurality of points;
   processing said input bathymetric data set to create at least one search limit grid defining a spatial area having at least one cell;
   establishing a geometric model for fitting to points of said input bathymetric data set, the established geometric model being characterizable by a minimum sample set number of points;
   receiving a first user defined probability value representing the probability that at least one minimum sample set of points within said input bathymetric data falls within the established geometric model for a cell, and a second user defined probability value representing the probability that any minimum sample set will fit the underlying model;
   obtaining a geometric model fit threshold;
   calculating the number of iterations required to obtain the geometric model that satisfies said probability value for one cell;
   selecting one cell in said created search limit grid;
   selecting at least one random minimum sample set of points within said input bathymetric data for the selected cell to determine the probability that the selected minimum set is within the geometric model representing said uniform distribution data set;
   performing the calculated number of iterations to determine parameters of the geometric model by consensus;
   removing at least one point of said input bathymetric data set plurality of points that is more than the geometric fit threshold away from the identified geometric model to give a data set with outliers removed;
   repeating said steps of selecting one cell, selecting a minimum sample set, performing and removing for each cell of said search limit grid; and
   utilizing the data set with outliers removed for each cell to create a georeference model.

2. The method of claim 1 further comprising the step of obtaining a node distance threshold, and wherein said step of removing at least one outlier point further includes removing at least one outlier point whose distance from a center of the identified geometric model exceeds the obtained node threshold.

3. The method of claim 1 further comprising the step of smoothing the boundary between geometric models in adjacent cells of said georeference model to give a final georeference model.

4. The method of claim 1 which further includes the step of using the georeference model to produce at least one bathymetric surface map.

5. The method of claim 1 wherein the geometric model is selected from the group consisting of a planar model, a biquadratic model, a spline model, and a combination of these geometric models.

6. The method of claim 1 further comprising the steps of:
   comparing said georeference model to at least one previously existing set of bathymetric data; and
   generating a report concerning the comparison.

7. The method of claim 1 which further includes the step of interpreting the georeference model to establish parameters of a function performed using a remote processor.

8. The method of claim 1 which further includes the step of interpreting the georeference model to establish parameters of a function performed on a bathymetric data set selected from the group consisting of an enhancing function, a verifying function, a correcting function, an upgrading function, a deleting function, an obscuring function and combinations thereof.

9. The method of claim 1 which wherein the step of calculating the number of iterations (k) uses the formula:

$$k = \frac{\log(1-p)}{\log(1-w^n)}$$

wherein p is the user defined probability value, w is the probability that any minimum sample set will fit the geometric model, and n is the number of points in the minimum sample set.

10. The method of claim 1 which further comprising the steps of:
    translating said georeference model to a satellite telemetry protocol; and
    transmitting said georeference model using said satellite telemetry protocol.

11. An apparatus comprised of:
    at least one input bathymetric data set source capable of producing a bathymetric data set having a plurality of points;
    at least one computer processor configured with software to calculate a number of iterations required to obtain a geometric model that satisfies the parameters of at least one user-defined value;
    at least one iterative processing component joined to receive bathymetric data from the bathymetric data set and the calculated number of iterations and further configured with software to perform the iterations to calculate a geometric model representing the bathymetric data, said iterative processing component capable of using the geometric model to identify a set of inlier data points and at least one outlier point from the bathymetric data;
    at least one georeference processing component configured with software to discard said at least one outlier point and to create at least one georeference model from the bathymetric data set with outlier points removed.

12. The apparatus of claim 11 further comprising a mapping processor configured with software to create a bathymetric surface map capable of being displayed on an updated graphical user interface.

13. The apparatus of claim 11 further comprising a satellite transmitter joined to said georeference processing component for transmitting said georeference model to a remote location.

14. The apparatus of claim 11 further comprising a database joined to said computer processor, said database being capable of providing information including at least one of pre-existing bathymetric data sets and pre-existing georeference models to said computer processor.

15. The apparatus of claim 14 wherein said computer processor is joined to receive the georeference model from the georeference processor, said computer processor being capable of matching said georeference model with said information from said database to provide navigational information.

16. The apparatus of claim 11 wherein said georeference processor updates said georeference model in real time.

\* \* \* \* \*